United States Patent
Johnson

(10) Patent No.: US 11,102,860 B2
(45) Date of Patent: Aug. 24, 2021

(54) BACKLIT DISPLAY DIMMING SYSTEM AND METHOD

(71) Applicant: Rockwell Collins, Inc., Cedar Rapids, IA (US)

(72) Inventor: Ricky J. Johnson, Shellsburg, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/529,302

(22) Filed: Aug. 1, 2019

(65) Prior Publication Data
US 2021/0037621 A1 Feb. 4, 2021

(51) Int. Cl.
| H05B 45/10 | (2020.01) |
| G02F 1/13357 | (2006.01) |
| G02F 1/1335 | (2006.01) |

(52) U.S. Cl.
CPC ....... H05B 45/10 (2020.01); G02F 1/133603 (2013.01); G02F 1/133606 (2013.01); G02F 1/133601 (2021.01); G02F 1/133612 (2021.01); G02F 1/133613 (2021.01)

(58) Field of Classification Search
CPC ............ H05B 37/0227; H05B 37/0281; H05B 37/036; H05B 45/10; H05B 45/31; H05B 45/32; G09G 3/2092; G09G 3/3426; G09G 3/3648
USPC ......... 315/297, 307, 312, 360; 345/102, 690
See application file for complete search history.

(56) References Cited

U.S. PATENT DOCUMENTS

| 3,885,682 | A | 5/1975 | McWilliams |
| 8,860,321 | B2* | 10/2014 | Ide ................ G09G 3/3406 315/186 |
| 2008/0232941 | A1 | 9/2008 | Goor et al. |
| 2009/0225020 | A1* | 9/2009 | Ran ................ H05B 45/37 345/102 |
| 2010/0283933 | A1* | 11/2010 | Schaeffer .......... G02F 1/133603 349/58 |
| 2011/0164069 | A1* | 7/2011 | Thompson ............. G09G 3/342 345/690 |
| 2012/0097498 | A1 | 4/2012 | Campbell et al. |
| 2012/0099049 | A1* | 4/2012 | Yamazaki ................ F21K 9/00 349/64 |
| 2013/0328866 | A1* | 12/2013 | Woodgate ............. G02B 30/26 345/419 |
| 2014/0241837 | A1 | 8/2014 | Bartelet |
| 2018/0050876 | A1 | 2/2018 | Hart |
| 2018/0132346 | A1* | 5/2018 | Yamano .................. H01G 4/40 |
| 2018/0186582 | A1 | 7/2018 | Borders et al. |
| 2018/0217447 | A1* | 8/2018 | Notoshi ............... G09G 3/3426 |

(Continued)

OTHER PUBLICATIONS

International Search Report for International Application No. PCT/US20/497654 dated Jan. 26, 2021, 13 pages.

*Primary Examiner* — Tung X Le
(74) *Attorney, Agent, or Firm* — Suiter Swantz pc llo

(57) ABSTRACT

A system, a display, and a method. The display may include a backlight including a plurality of light emitting diodes (LEDs), the plurality of LEDs comprising a first group of LEDs and a second group of LEDs. The display may further include a processor communicatively coupled to the plurality of LEDs. The processor may be configured to: cause the first group of LEDs to pulse; and cause the second group of LEDs to pulse, wherein the first group of LEDs pulse out of phase from the second group of LEDs.

20 Claims, 5 Drawing Sheets

(56) References Cited

U.S. PATENT DOCUMENTS

2019/0244572 A1* 8/2019 Le .................. G09G 3/3406
2019/0369389 A1* 12/2019 Carpenter .......... G02B 27/0006

* cited by examiner

BACKLIT DISPLAY DIMMING SYSTEM AND METHOD

BACKGROUND

Military flight deck displays can require backlights that have a 100,000:1 or more dimming range. Backlight light emitting diodes (LEDs) in displays are currently dimmed using a combination of pulse width, pulse frequency and LED drive current. The minimum pulse width is related to the LED and drive electronics. Currently, if the effective pulse frequency gets below 100 Hertz (Hz) flicker starts to become visible. Currently, at LED currents below 5 milliampere (mA), LED optical characteristics become unpredictable. As LEDs and backlights become more efficient, achieving large dimming ranges becomes increasingly difficult.

SUMMARY

In one aspect, embodiments of the inventive concepts disclosed herein are directed to a system. The system may include a display. The display may include a backlight including a plurality of light emitting diodes (LEDs), the plurality of LEDs comprising a first group of LEDs and a second group of LEDs. The display may further include a processor communicatively coupled to the plurality of LEDs. The processor may be configured to: cause the first group of LEDs to pulse; and cause the second group of LEDs to pulse, wherein the first group of LEDs pulse out of phase from the second group of LEDs.

In a further aspect, embodiments of the inventive concepts disclosed herein are directed to a display. The display may include a backlight including a plurality of light emitting diodes (LEDs), the plurality of LEDs comprising a first group of LEDs and a second group of LEDs. The display may further include a processor communicatively coupled to the plurality of LEDs. The processor may be configured to: cause the first group of LEDs to pulse; and cause the second group of LEDs to pulse, wherein the first group of LEDs pulse out of phase from the second group of LEDs.

In a further aspect, embodiments of the inventive concepts disclosed herein are directed to a method. The method may include causing, by a processor of a display, a first group of light emitting diodes (LEDs) to pulse, wherein the display comprises a backlight and the processor, wherein the backlight comprises a plurality of LEDs, the plurality of LEDs comprising the first group of LEDs and a second group of LEDs, wherein the processor is communicatively coupled to the plurality of LEDs. The method may further include causing, by the processor, the second group of LEDs to pulse, wherein the first group of LEDs pulse out of phase from the second group of LEDs.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
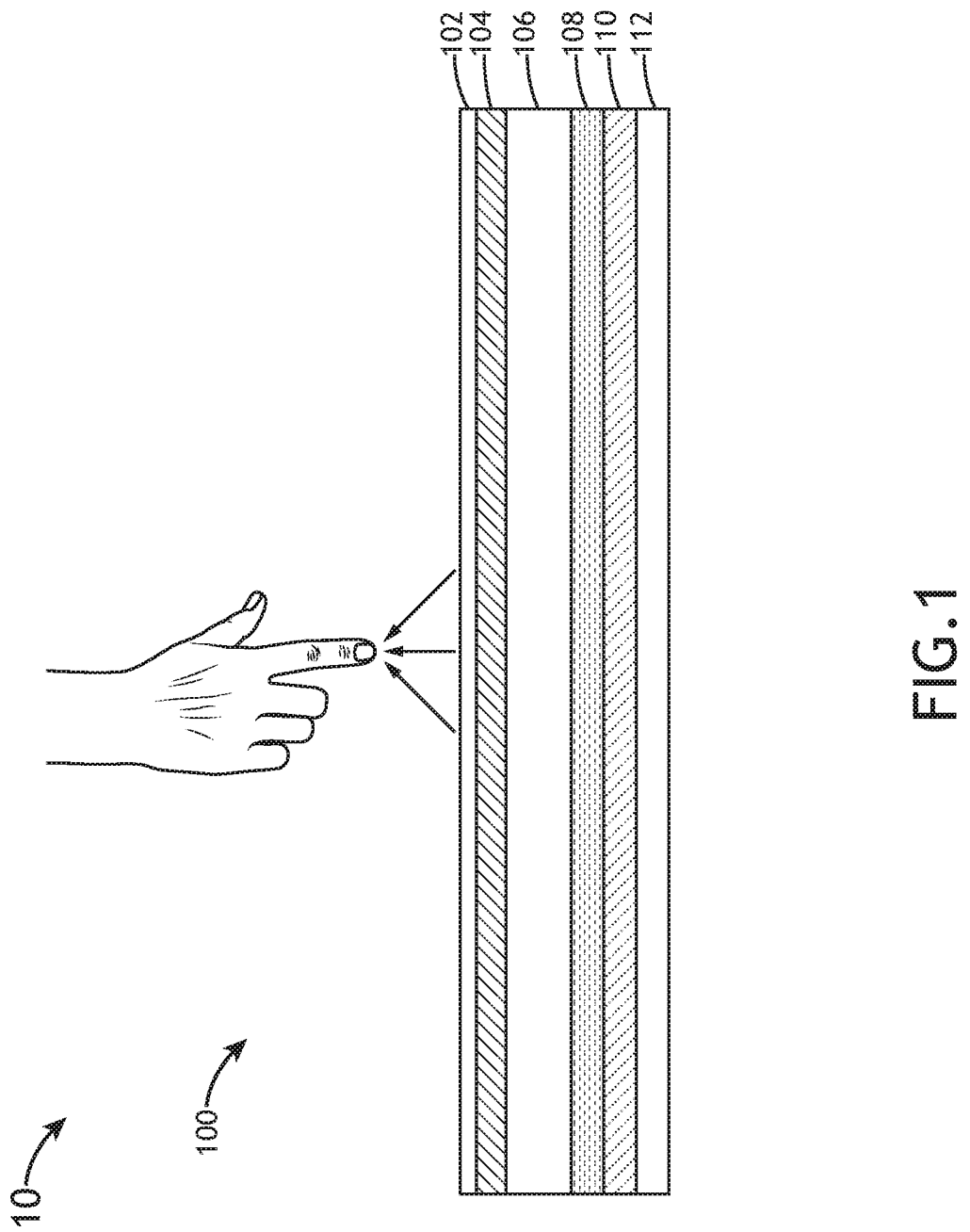
FIG. 1 is a view of an exemplary embodiment of a system including a vehicle including a display according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method, system, and display configured to provide a dimming effect to a backlight.

Some embodiments provide a method to dim LED backlights that may be combined with a pulse width dimming method, a pulse frequency dimming method, and LED drive current method to significantly increase an LED backlight's dimming range. Some embodiments may include a controller configured to drive multiple groups (e.g., sections) of backlight LEDs, with each group out of phase (e.g., at less than 100 Hz) from another group. Typically, backlights have a plurality of (e.g., several hundred) LEDs. For example, if the LEDs are driven at 50 Hz but with half of the LEDS out of phase from the other half of the LEDS, minimum luminance would effectively be reduced by 50%. The eye would not perceive flicker because the effective frequency of the two halves of LEDs is at 100 Hz. For example, the groups of LEDs may be implemented spatially (e.g., uniformly spatially and/or interlaced) across the backlight with an optical diffuser implemented in a display stack so the viewer does not see the individual LEDs pulsing at 50 Hz and cannot perceive the 100 Hz rate at which the backlight is pulsing. Some embodiments may include the use of any suitable frequencies and/or any suitable number of groups of LEDs that are out of phase from other groups of LEDs. For example, four groups of LEDs pulsing at 25 Hz may each be out of phase to reduce the luminance by a factor of 4. Some embodiments include a means to extend dimming range of displays (e.g., flight deck backlit displays) and provide new capabilities currently not available.

Referring now to FIG. 1, an exemplary embodiment of a system including a vehicle (e.g., an automobile, a train, a watercraft, a submarine, an aircraft 10 (e.g., such as a military or commercial aircraft)) including a display (e.g., a transmissive touchscreen display 100) is depicted according to the inventive concepts. In some embodiments, the transmissive touchscreen display 100 may be implemented as a vehicle transmissive touchscreen display (e.g., an aircraft transmissive touchscreen display (e.g., a military aircraft transmissive touchscreen display) implemented in a fight deck). In some embodiments, the display may be implemented as any suitable display device, such as a television, a monitor, a tablet display, a mobile phone display, a vehicle display, a flight deck display, or the like.

In some embodiments, the display (e.g., the transmissive touchscreen display 100) may include a display stack. The display stack may include a transparent protective cover 102, a touchscreen sensor 104 (e.g., a projected capacitance touchscreen sensor or a resistive touchscreen sensor) implemented in a layer, a transparent substrate 106, a transmissive display element 108 (e.g., a liquid crystal display (LCD) element), a diffuser 110, and a backlight 112. In some embodiments, the diffuser 110 may be positioned between the backlight 112 and the transmissive display element 108. The diffuser 110 may be configured to mix the output of LEDs of the backlight 112 so that individual LEDs are not visible to user. The display stack may include additional layers or omit one or more of the depicted layers. The transmissive touchscreen display 100 may be implemented as any suitable transmissive touchscreen display, such as an LCD touchscreen display. The backlight 112 may include a plurality of light emitting diodes (LEDs) (e.g., LEDs 208-1, 208-2, 208-3, and/or 208-4).

Figure 2:
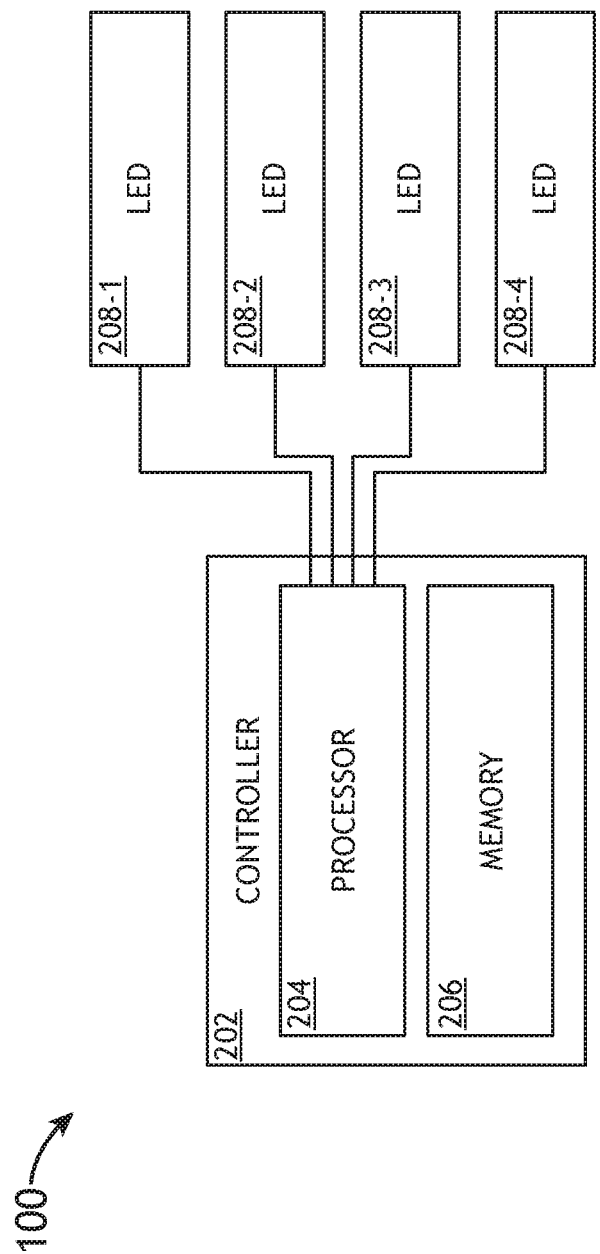
FIG. 2 is a view of an exemplary embodiment of the display of FIG. 1 according to the inventive concepts disclosed herein.

Referring now to FIG. 2, an exemplary embodiment of the display (e.g., the transmissive touchscreen display 100) of FIG. 1 is depicted according to the inventive concepts. As shown in FIG. 2, the transmissive touchscreen display 100 may include at least one controller 202 and a plurality of groups of LEDs (e.g., 208-1, 208-2, 208-3, and/or 208-4), as well as other components, equipment, and/or devices commonly included in a display (e.g., a transmissive touchscreen display), some or all of which may be communicatively coupled. The plurality of groups of LEDs (e.g., 208-1, 208-2, 208-3, and/or 208-4) may include any suitable number of groups, such as two, three, four, five, ... 10, or more.

The at least one controller 202 may be communicatively coupled with the plurality of groups of LEDs (e.g., 208-1, 208-2, 208-3, and/or 208-4). The at least one controller 202 may include at least one processor 204 and at least one memory 206, which may be communicatively coupled. The processor 204 may be communicatively coupled with the plurality of groups of LEDs (e.g., 208-1, 208-2, 208-3, and/or 208-4), as well as other components of the display (e.g., the transmissive touchscreen display 100). The processor 204 may be implemented as any suitable processor, such as a general purpose processor or a field-programmable gate array (FPGA). The processor 204 may be configured to run various software applications or computer code stored (e.g., maintained) in a non-transitory computer-readable medium (e.g., memory 206) and configured to execute various instructions or operations. The processor 204 may be implemented as a special purpose processor configured (e.g., programmed) to execute instructions for performing any or all of the operations disclosed throughout.

For example, the processor 204 may be configured to receive an instruction to adjust a dimness of the display (e.g., the transmissive touchscreen display 100), such as an instruction to make the display dimmer. For example, in response to the instruction, the processor 204 may be configured to cause each of the plurality of groups of LEDs (e.g., 208-1, 208-2, 208-3, and/or 208-4) to pulse, wherein each of the plurality of groups of LEDs (e.g., 208-1, 208-2, 208-3, and/or 208-4) may pulse out of phase from the other groups of LEDs (e.g., 208-1, 208-2, 208-3, and/or 208-4).

The backlight 112 may include the plurality of groups of LEDs (e.g., 208-1, 208-2, 208-3, and/or 208-4). In some embodiments, the groups of LEDs (e.g., 208-1, 208-2, 208-3, and/or 208-4) may be interspersed (e.g., intermingled and/or interlaced) across the backlight 112 such that a dimming effect is perceived across the whole display. In some embodiments, a user in view of the display may perceives a dimming effect based at least on the groups of LEDs pulsing out of phase from one another as compared to the groups of LEDs pulsing in phase. In some embodiments, an effective pulse frequency of the groups of LEDs may be at least 100 Hertz Hz so as to have flickering imperceptible to a user, even though each of the of groups of LEDs (e.g., 208-1, 208-2, 208-3, and/or 208-4) may have a pulse frequency of less than 100 Hz.

Figure 3:
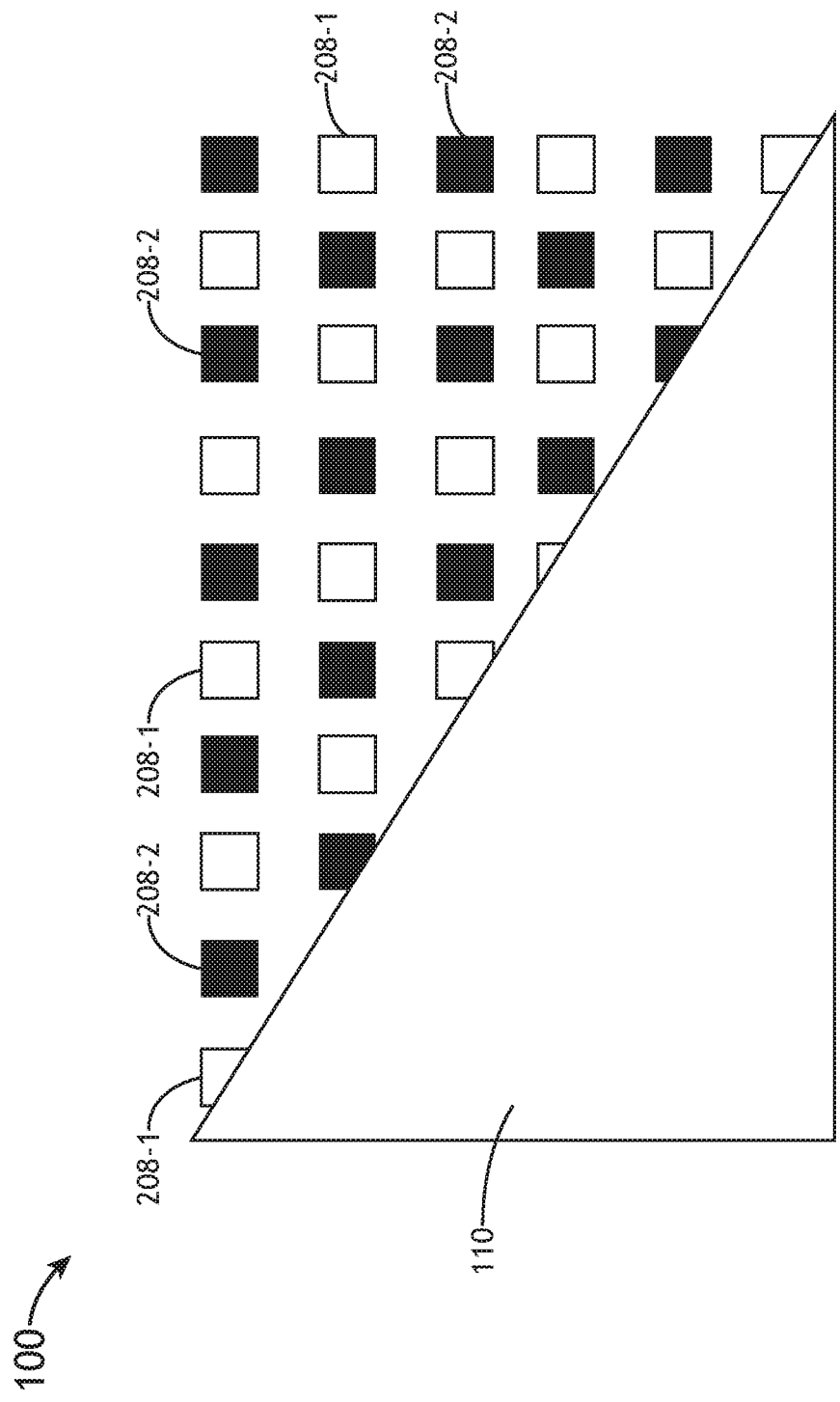
FIG. 3 is a view of an exemplary embodiment of the display of FIG. 1 according to the inventive concepts disclosed herein.

Referring now to FIG. 3, an exemplary embodiment of the display (e.g., the transmissive touchscreen display 100) of FIG. 1 is depicted according to the inventive concepts. As shown in FIG. 3, the backlight 112 may include two groups of LEDs 208-1, 208-2 that pulse out of phase from one another. An effective pulse frequency of the first group of LEDs 208 pulsing out of phase from the second group of LEDs 208-2 may be at least 100 Hz. In some embodiments, a pulse frequency of each of the first group of LEDs 208-1 and the second group of LEDs 208-2 may be between 50 Hz and 100 Hz (e.g., between 50 Hz and 80 Hz). For example, the backlight 112 with two groups of LEDs 208-1, 208-2, each pulsing at 50 Hz out of phase from one another, may produce half the luminance when compared to a backlight with all LEDs pulsing at 100 Hz.

Figure 4:
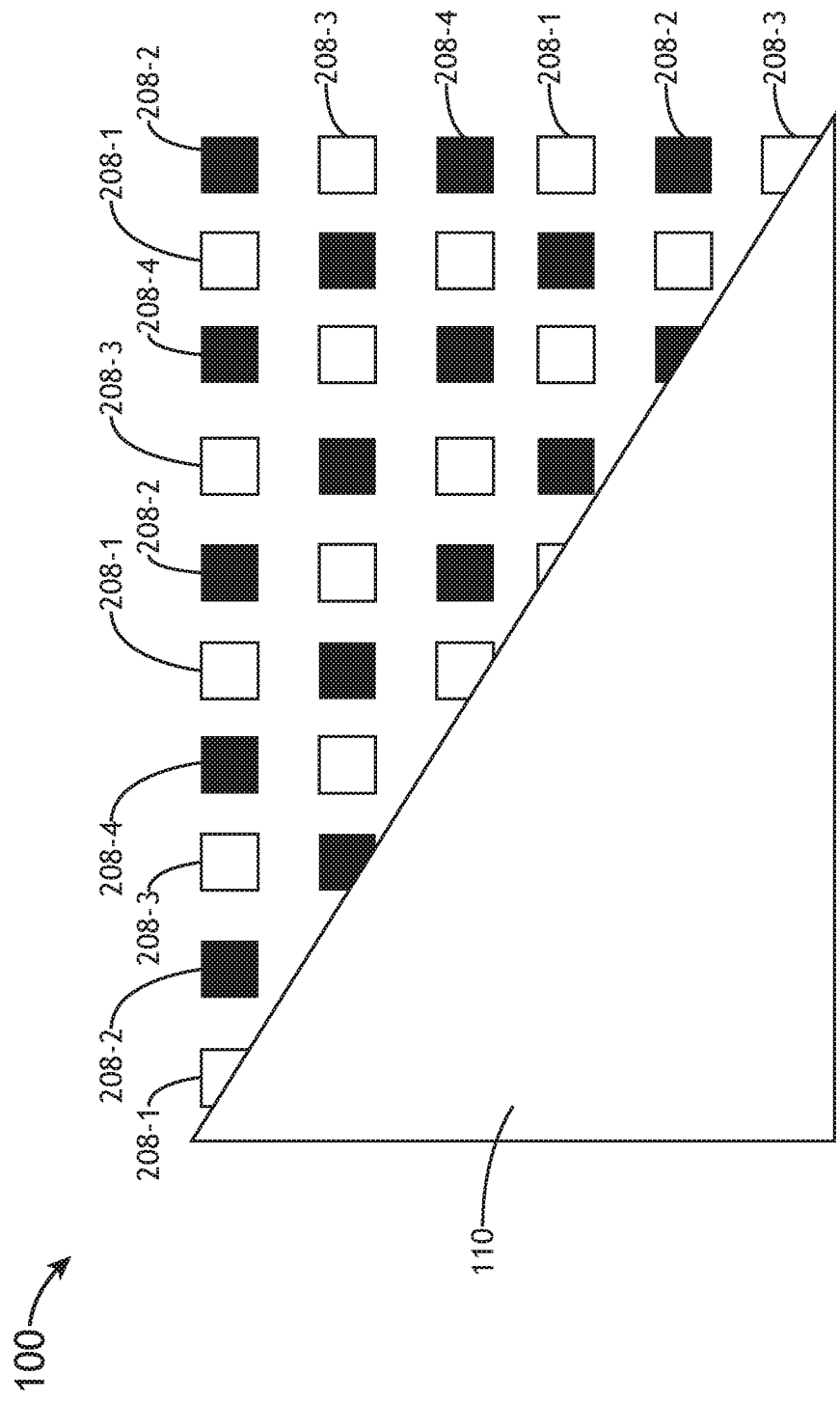
FIG. 4 is a view of an exemplary embodiment of the display of FIG. 1 according to the inventive concepts disclosed herein.

Referring now to FIG. 4, an exemplary embodiment of the display (e.g., the transmissive touchscreen display 100) of FIG. 1 is depicted according to the inventive concepts. As shown in FIG. 4, the backlight 112 may include four groups of LEDs 208-1, 208-2, 208-3, 280-4 that pulse out of phase from one another. An effective pulse frequency of the first group of LEDs 208-1, the second group of LEDs 208-2, the third group of LEDs 208-3, and the fourth group of LEDs 208-4 pulsing out of phase from one another may be at least 100 Hz. In some embodiments, a pulse frequency of each of the four groups of LEDs 208-1, 208-2, 208-3, 208-4 may be between 25 Hz and 100 Hz (e.g., between 25 Hz and 50 Hz). For example, the backlight 112 with four groups of LEDs 208-1, 208-2 208-3, 208-4, each pulsing at 25 Hz out of phase from one another, may produce ¼ the luminance when compared to a backlight with all LEDs pulsing at 100 Hz.

For another exemplary embodiment of the display (e.g., the transmissive touchscreen display 100), the backlight 112 may include three groups of LEDs 208-1, 208-2, 208-3 that pulse out of phase from one another. An effective pulse frequency of the first group of LEDs 208-1, the second group of LEDs 208-2, and the third group of LEDs 208-3 pulsing out of phase from one another may be at least 100 Hz. In some embodiments, a pulse frequency of each of the three groups of LEDs 208-1, 208-2, 208-3 may be between 33 Hz and 100 Hz (e.g., between 33 Hz and 50 Hz). For example, the backlight 112 with three groups of LEDs 208-1, 208-2 208-3, each pulsing at 33 Hz out of phase from one another, may produce ⅓ the luminance when compared to a backlight with all LEDs pulsing at 100 Hz.

While examples with two, three, or four groups of LEDs have been disclosed, some embodiments may include any suitable number (e.g., two, three, four, five, six, . . . 10, . . . 20, or more) of groups of LEDs. For example, X groups of LEDs may be utilized, and a pulse frequency of each of the X groups of LEDs may be between 100/X Hz and 100 Hz. For example, the backlight 112 with X groups of LEDs, each pulsing at 100/X Hz out of phase from one another, may produce 1/X the luminance when compared to a backlight with all LEDs pulsing at 100 Hz.

Figure 5:
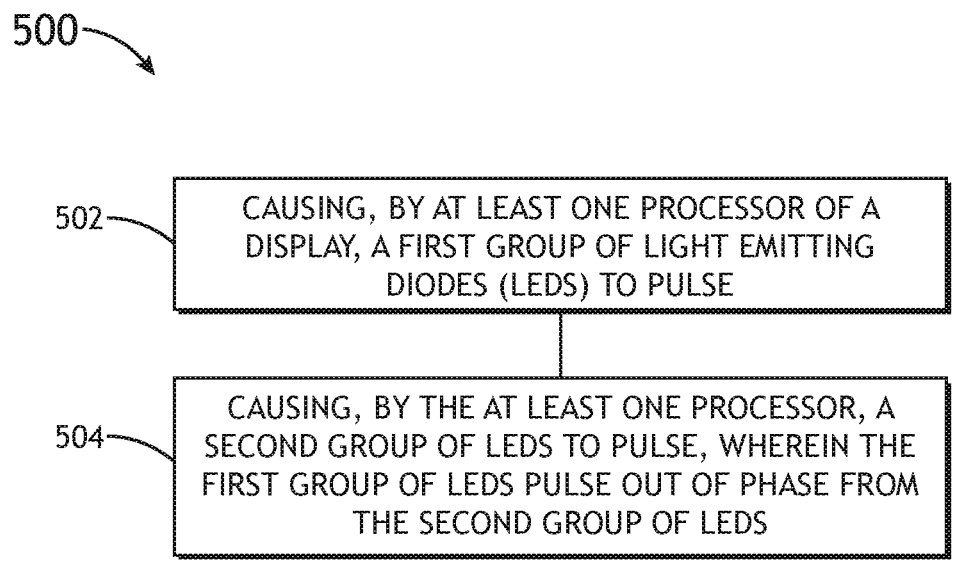
FIG. 5 is a diagram of an exemplary embodiment of a method according to the inventive concepts disclosed herein.

Referring now to FIG. 5, an exemplary embodiment of a method 500 according to the inventive concepts disclosed herein may include one or more of the following steps. Additionally, for example, some embodiments may include performing one more instances of the method 500 iteratively, concurrently, and/or sequentially.

A step 502 may include causing, by at least one processor of a display, a first group of light emitting diodes (LEDs) to pulse.

A step 504 may include causing, by the at least one processor, a second group of LEDs to pulse, wherein the first group of LEDs pulse out of phase from the second group of LEDs.

Further, the method 500 may include any of the operations disclosed throughout.

As will be appreciated from the above, embodiments of the inventive concepts disclosed herein may be directed to a method, system, and display configured to provide a dimming effect to a backlight.

As used throughout and as would be appreciated by those skilled in the art, "at least one non-transitory computer-readable medium" may refer to as at least one non-transitory computer-readable medium (e.g., memory, storage, or a combination thereof; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
   a display, wherein the display is a flight deck backlit display, comprising:
   a backlight comprising a plurality of light emitting diodes (LEDs), the plurality of LEDs comprising X groups of LEDs, X being an integer greater than or equal to two, each group of the X groups interspersed vertically and horizontally in relation to other of the X groups, the X groups of LEDs comprising a first group of LEDs and a second group of LEDs; and
   at least one processor communicatively coupled to the plurality of LEDs, wherein the at least one processor is configured to:
      receive an instruction to dim the display below a minimum luminance of all of the plurality of LEDs pulsing in phase;
      in response to the instruction, cause the first group of LEDs to pulse; and
      in response to the instruction, cause the second group of LEDs to pulse, wherein the first group of LEDs pulse out of phase from the second group of LEDs, wherein the backlight has a reduced minimum luminance when pulsing the first group of LEDs out of phase from the second group of LEDs as compared to pulsing the first group of LEDs in phase with the second group of LEDs, and
      wherein an effective pulse frequency of the X groups of LEDs pulsing out of phase from one another is at least 100 Hertz (Hz).

2. The system of claim 1, wherein the display is a transmissive display.

3. The system of claim 1, wherein the display is a touchscreen display.

4. The system of claim 1, wherein the display further comprises a diffuser and a transmissive display element, wherein the diffuser is positioned between the backlight and the transmissive display element.

5. The system of claim 1, wherein a user in view of the display perceives a dimming effect based at least on the first group of LEDs pulsing out of phase from the second group of LEDs as compared to the first group of LEDs and the second group of LEDs pulsing in phase.

6. The system of claim 1, further comprising a vehicle, wherein the display is implemented in the vehicle.

7. The system of claim 6, wherein the vehicle is an aircraft.

8. The system of claim 1, wherein an effective pulse frequency of the first group of LEDs pulsing out of phase from the second group of LEDs is at least 100 Hertz (Hz).

9. The system of claim 8, further comprising a vehicle, wherein the display is implemented in the vehicle, wherein a pulse frequency of each of the first group of LEDs and the second group of LEDs is between 50 Hz and 100 Hz, wherein the reduced minimum luminance is 50% of the minimum luminance of all of the plurality of LEDs pulsing in phase.

10. The system of claim 8, wherein a pulse frequency of each of the first group of LEDs and the second group of LEDs is between 50 Hz and 80 Hz.

11. The system of claim 1, wherein the X groups of LEDs further comprises a third group of LEDs, wherein the at least one processor is further configured to cause the third group of LEDs to pulse, wherein the first group of LEDs pulse out of phase from the second group of LEDs and the third group of LEDs, wherein the second group of LEDs pulse out of phase from the first group of LEDs and the third group of LEDs, wherein the third group of LEDs pulse out of phase from the first group of LEDs and the second group of LEDs.

12. The system of claim 11, wherein an effective pulse frequency of the first group of LEDs, the second group of LEDs, and the third group of LEDs pulsing out of phase from one another is at least 100 Hertz (Hz), wherein the reduced minimum luminance is one-third of the minimum luminance of all of the plurality of LEDs pulsing in phase.

13. The system of claim 12, further comprising a vehicle, wherein the display is implemented in the vehicle, wherein a pulse frequency of each of the first group of LEDs, the second group of LEDs, and the third group of LEDs is between 33 Hz and 100 Hz.

14. The system of claim 12, wherein a pulse frequency of each of the first group of LEDs, the second group of LEDs, and the third group of LEDs is between 33 Hz and 50 Hz.

15. The system of claim 1, wherein the X groups of LEDs further comprises a third group of LEDs and a fourth group of LEDs, wherein the at least one processor is further configured to cause the third group of LEDs to pulse and to cause the fourth group of LEDs to pulse, wherein the first group of LEDs pulse out of phase from the second group of LEDs, the third group of LEDs, and the fourth group of LEDs, wherein the second group of LEDs pulse out of phase from the first group of LEDs, the third group of LEDs, and the fourth group of LEDs, wherein the third group of LEDs pulse out of phase from the first group of LEDs, the second group of LEDs, and the fourth group of LEDs, wherein the fourth group of LEDs pulse out of phase from the first group of LEDs, the second group of LEDs, and the third group of LEDs.

16. The system of claim 15, wherein an effective pulse frequency of the first group of LEDs, the second group of LEDs, the third group of LEDs, and the fourth group of LEDs pulsing out of phase from one another is at least 100 Hertz (Hz), wherein the reduced minimum luminance is 25% of the minimum luminance of all of the plurality of LEDs pulsing in phase.

17. The system of claim 16, further comprising a vehicle, wherein the display is implemented in the vehicle, wherein a pulse frequency of each of the first group of LEDs, the second group of LEDs, the third group of LEDs, and the fourth group of LEDs is between 25 Hz and 100 Hz.

18. The system of claim 16, wherein a pulse frequency of each of the first group of LEDs, the second group of LEDs, the third group of LEDs, and the fourth group of LEDs is between 25 Hz and 50 Hz.

19. A display, comprising:
   a backlight comprising a plurality of light emitting diodes (LEDs), the plurality of LEDs comprising X groups of LEDs, X being an integer greater than or equal to two, each group of the X groups interspersed vertically and horizontally in relation to other of the X groups, the X groups of LEDs comprising a first group of LEDs and a second group of LEDs; and
   at least one processor communicatively coupled to the plurality of LEDs, wherein the at least one processor is configured to:
      receive an instruction to dim the display below a minimum luminance of all of the plurality of LEDs pulsing in phase;
      in response to the instruction, cause the first group of LEDs to pulse; and
      in response to the instruction, cause the second group of LEDs to pulse, wherein the first group of LEDs pulse out of phase from the second group of LEDs, wherein the backlight has a reduced minimum luminance when pulsing the first group of LEDs out of phase from the second group of LEDs as compared to pulsing the first group of LEDs in phase with the second group of LEDs, wherein an effective pulse frequency of the X groups of LEDs pulsing out of phase from one another is at least 100 Hertz (Hz), wherein the display is a flight deck backlit display.

20. A method, comprising:

receiving, by at least one processor of a display, an instruction to dim the display below a minimum luminance of all of a plurality of light emitting diodes (LEDs) pulsing in phase, wherein the display is a flight deck backlit display, wherein the display comprises a backlight and the at least one processor, wherein the backlight comprises the plurality of LEDs, the plurality of LEDs comprising X groups of LEDs, X being an integer greater than or equal to two, each group of the X groups interspersed vertically and horizontally in relation to other of the X groups, the X groups of LEDs comprising a first group of LEDs and a second group of LEDs, wherein the at least one processor is communicatively coupled to the plurality of LEDs;

in response to the instruction, causing, by the at least one processor of the display, the first group of LEDs to pulse; and in response to the instruction, causing, by the at least one processor, the second group of LEDs to pulse, wherein the first group of LEDs pulse out of phase from the second group of LEDs, wherein the backlight has a reduced minimum luminance when pulsing the first group of LEDs out of phase from the second group of LEDs as compared to pulsing the first group of LEDs in phase with the second group of LEDs, wherein an effective pulse frequency of the X groups of LEDs pulsing out of phase from one another is at least 100 Hertz (Hz).

* * * * *